Aug. 19, 1952 K. M. LEDERER 2,607,812
ELECTRICAL INSTRUMENT WITH PERMANENT MAGNET CORE
Filed Dec. 6, 1948 2 SHEETS—SHEET 1

Inventor:
Karl M. Lederer,

By Pierce, Scheffler & Parker,
Attorneys.

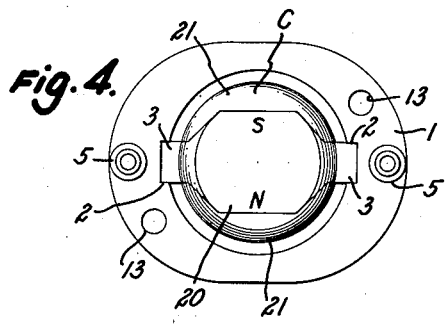
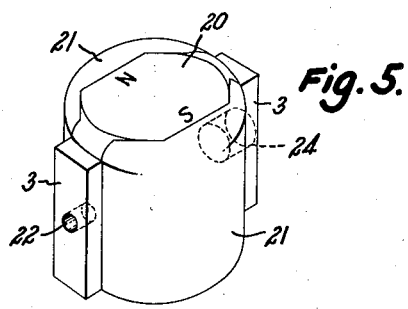
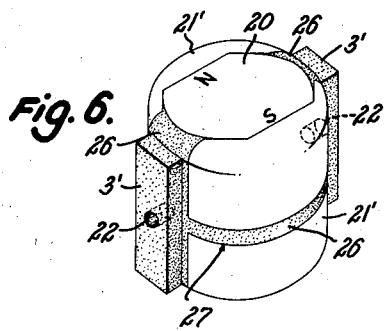
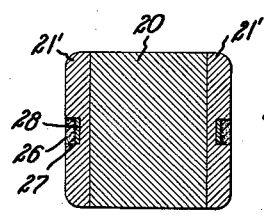
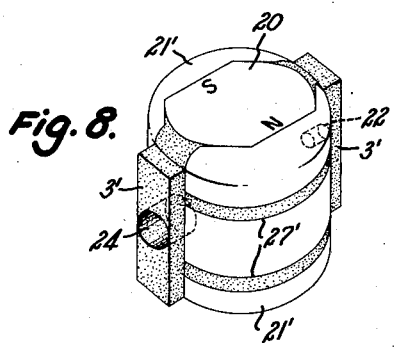
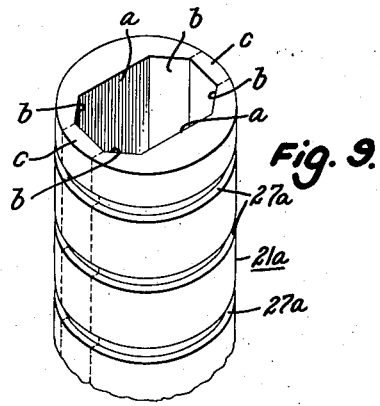

Patented Aug. 19, 1952

2,607,812

UNITED STATES PATENT OFFICE 2,607,812

ELECTRICAL INSTRUMENT WITH PERMANENT MAGNET CORE

Karl M. Lederer, Newark, N. J., assignor to Weston Electrical Instrument Corporation, Newark, N. J., a corporation of New Jersey Application December 6, 1948, Serial No. 63,748

12 Claims. (Cl. 171—95)

This invention relates to electrical instruments with permanent magnet cores, and particularly to the mechanical construction and mounting of the magnetic core elements.

The permanent magnet core type of electrical measuring instruments and relays has the advantages, as compared with the older C-shaped magnet and soft iron core type, of smaller size and lighter weight for most any given instrument sensitivity. The instruments are also self-shielded against external magnetic fields since the soft iron yoke or return path for the magnetic flux extends around the permanent magnet core and the movable coil. Soft iron pole pieces have been employed with some of the prior magnetic core instruments but the prior constructions have been open to the objections that they did not lend themselves to mass production methods and did not afford a sufficiently large angular deflection of the movable system.

Objects of the invention are to provide instrument magnet systems, and instruments with magnet systems, in which the permanent magnet core elements can be manufactured economically and with substantial uniformity by mass production methods. Objects are to provide permanent magnet core elements, and instruments with permanent magnet core elements, which include an elongated transversely magnetized permanent magnet, and arcuate pole pieces and mounting ribs secured thereto to form a cylinder with the mounting ribs projecting diametrically therefrom. Other objects are to provide permanent magnet core elements as above stated in which the components are united by soldering or cementing, or by molding die metal or a plastic on or about the magnetic material parts. Further objects are to provide permanent magnet core elements in which the permanent magnet and the pole shoes are of such shape, in transverse cross-section, as to result in a substantially uniform flux distribution in the air gap of an instrument having a long scale length of, for example, up to 115°.

These and other objects and the advantages of the invention will be apparent from the following specification when taken with the accompanying drawings in which:

Fig. 4 is a bottom plan view of the core magnet and yoke assembly of the instrument;

Fig. 5 is a perspective view of the core assembly;

Figs. 6 and 7 are a perspective view and central section, respectively, of another form of core magnet assembly;

Fig. 8 is a perspective view of another core assembly embodying the invention; and Fig. 9 is a fragmentary perspective view of hollow bar stock of soft iron which may be employed in the manufacture of pole shoes.

Figure 1:
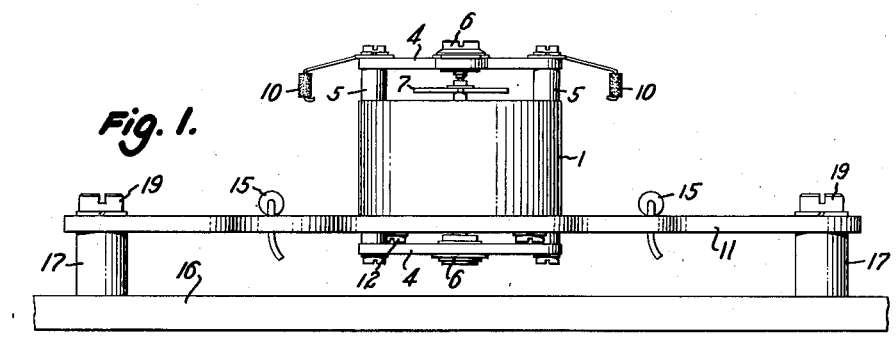
Fig. 1 is a side elevation of the essential elements of an electrical measuring instrument embodying the invention.
Figure 2:
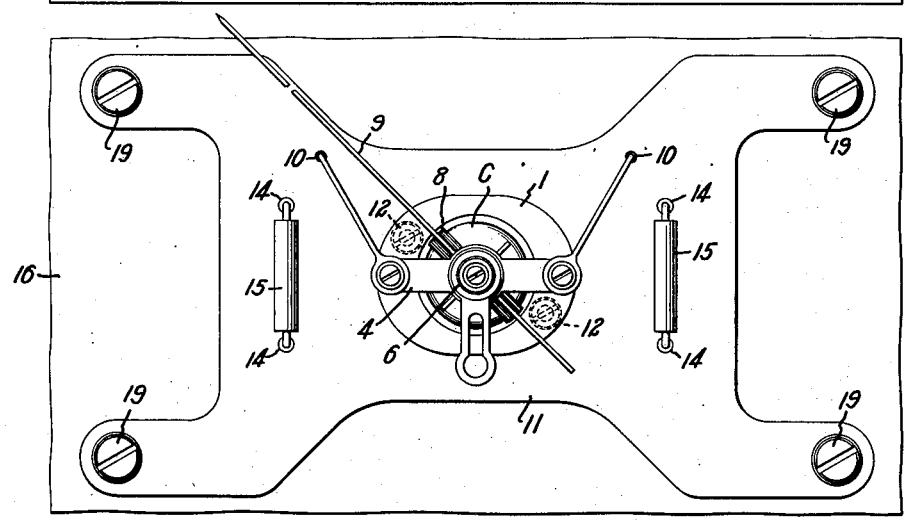
Fig. 2 is a plan view of the instrument.

In the drawings, the reference character C identifies generally a permanent magnet core element within the cylindrical bore of a soft iron yoke 1 which may be, as shown, of increased radial thickness at diametrically opposed regions where longitudinal slots 2 are accurately formed or cut to receive snugly a pair of longitudinally extending mounting ribs 3 of the core C. Bridges 4, 4 are mounted on posts 5 having reduced diameter ends threaded into openings in the yoke 2, and conventional bearing assemblies 6 and springs 7 are carried by the bridges to support a coil 8 for pivotal movement in the annular gap between the magnetic core C and the yoke 1. The moving coil carries a pointer or a contact arm 9 which moves over a scale or with respect to stationary contacts, not shown. Conventional stops 10 for limiting the angular displacement of pointer 9 may be mounted upon the upper bridge 4. The yoke 1 rests upon and is secured to a centrally-apertured mounting plate 11 by screws 12 which seat in threaded openings 13, note Fig. 4, in the lower end of the yoke. The mounting plate 11 is provided with openings 14, threaded or not as may be desired, for the mounting of auxiliary elements 15 which may be rectifiers and/or resistances, etc.

The entire instrument mechanism may be assembled on the mounting plate 11 and tested before it is secured to the base 16 of an instrument casing in any desired manner. As illustrated in Fig. 1, the mounting plate 11 is supported on studs 17 which have lower ends threaded into blind inserts 18 in the molded insulating base 16 of the instrument casing, and screws 19 extend through openings in the mounting plate and are threaded into the studs 17 to anchor the mounting plate 11 to the mounting studs 17.

The core C comprises an elongated cylindrical permanent magnet 20 which is non-circular in transverse cross-section, i. e. it may be of rectangular cross-section or, as illustrated, it takes the form of a cylinder from which oppositely located cylindrical segments have been cut away along parallel planes symmetrically positioned with respect to the axis of the cylinder. The magnet 20 is transversely magnetized in its shorter direction, whereby the parallel rectangular surfaces are the polar surfaces of the magnet. The major transverse dimension of the magnet 20 is somewhat smaller than the diameter of the core assembly, and the mounting ribs 3 have wide arcuate base surfaces which conform to and are soldered, brazed, cemented or molded to the arcuate shorter sides of the magnet 20. Soft iron pole shoes 21 of substantially segmental cross-section are likewise soldered, brazed, cemented or molded to the flat surfaces of the magnet 20, and their edges terminate in short flanges which overlap the flaring base sections of and seat against the side edges of the mounting ribs 3. The core parts are held in a jig during the assembly operation to insure uniformity in the dimensions of the core assemblies.

The mounting ribs are of non-magnetic material, for example brass, Phosphor bronze or beryllium copper, and are accurately dimensioned for a relatively snug fit within the guide grooves 2 of the yoke 1. One mounting rib 3 is drilled radially to provide a small cylindrical bore 22 for receiving the cylindrical tip of a positioning screw 23 of non-magnetic material which is threaded into a bore of the yoke 1. The other mounting rib 3 is drilled to provide a larger diameter cylindrical bore 24 for receiving the cylindrical end of an iron positioning screw 25 which anchors the core assembly in the yoke 1 and also constitutes a magnetic shunt between the edges of the pole shoes 21 for adjusting the sensitivity of the instrument. The effective value of the magnetic shunt depends of course upon the extent to which the cylindrical tip of iron screw 25 is projected into the gap between the pole shoes 21.

The soft iron pole shoes 21 may be sintered from powdered iron in suitable dies and, in accordance with current practice, to accurate dimensions within very close tolerancecs. Alternatively, the pole pieces may be cut from accurately dimensioned bar stock of soft iron, as will be hereinafter explained.

Another core assembly, as illustrated in Figs. 6 and 7, includes a transversely magnetized bar 20 which may have flat side edges or, as illustrated, arcuate edges, a pair of pole shoes 21′, and a plastic material or die metal 26, 26 molded or die-cast upon the magnetic material parts to complete a cylindrical core assembly having projecting mounting ribs 3′, 3′. The pole shoes 21′ have transversely alined circumferential grooves 27 within which a retaining ring 28 of Phosphor bronze or beryllium copper is seated. The ring 28 holds the pole pieces against the magnet during the molding operation and it adds strength to the finished structure. Ring 28 may be circumferentially split but preferably is a complete ring of proper internal diameter to hold the pole pieces 21′ snugly to the magnet 20. In assembly, the ring 28 is slipped over two pole pieces and seated in the grooves 27, and the magnet 20 is then forcibly slid down between the pole pieces, thereby spreading them apart. The ring 28 does not completely fill the grooves 27, and circumferential strips of the molded material 26 overlie the ring 28 to bond the ribs 3′, 3′ to each other.

Figure 3:
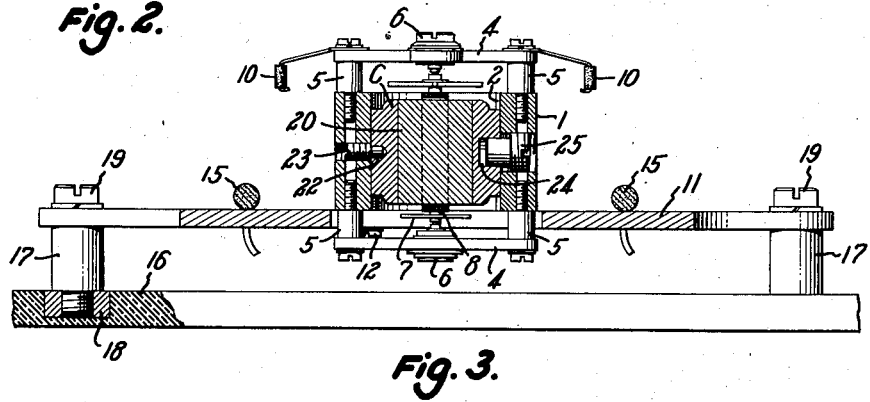
Fig. 3 is a central vertical section through the same.

As shown in Fig. 7, both mounting ribs 3′, 3′ are provided with small bores 22 for receiving small diameter positioning screws 23, Fig. 3.

The molded material 26 does not have the mechanical strength of the bronze or copper mounting ribs 3, 3 of a core assembly as illustrated in Figs. 1 to 5, but one of the molded mounting ribs 3′ may be provided with a large bore 24 for receiving a magnetic shunt screw 25, see Fig. 3, when the pole pieces 21′ are provided with a plurality of grooves 27′ for receiving retaining bands and molded material strips, see Fig. 8.

In place of forming the soft iron pole pieces or shoes 21 and 21′ by a powdered metallurgy process, they may be cut from hollow cylindrical stock 21a, Fig. 9. The opening through the bar stock has the shape, in transverse cross-section, of an elongated octagon with the longer parallel sides $a$ accurately dimensioned to the transverse width of the flat polar surfaces of the permanent magnet bars 20. The sides $b$ flare from the ends of the sides $a$ at appropriate angles to provide gaps for receiving the flaring bases of the mounting ribs 3 or 3′. The bar stock 21a is forged or broached to the desired internal dimension, and then machined or ground to the desired external diameter. Circumferential slots 27a are machined in the hollow rod 21a when the finished core assemblies are to be of the types shown in Figs. 6, 7 and 8. The stock rod 21a is then milled to remove the diametrically opposed sections $c$, thus dividing the stock into two elongated strips of the desired transverse cross-section of the pole shoes. The strips are then cut to the desired length and with the circumferential grooves 27a, when such grooves are present, appropriately spaced from the cutting planes.

The width of the milling cutter may be such that the arcuate surfaces of the pole shoes have a circumferential length somewhat short of the circumferential spacing of the mounting ribs 3 or 3′, whereby parts of the arcuate surface of the magnetized core assembly are provided by the non-magnetic mounting rib material, as shown in Fig. 6. Alternatively, as illustrated in Figs. 4, 5 and 8, the soft iron pole shoes may span the entire circumference from one mounting rib to the other.

The pole shoes compensate for the irregularities in flux density at the polar surface of the permanent magnet which arise from variations in the hardness or composition of the permanent magnet at different regions, and thus afford a substantially uniform flux density along the air gaps in which the coil moves. Particular attention is directed to the fact that the pole shoes "overhang" the polar surfaces of the magnet, i. e., they have a circumferential length far greater than that which would result if the pole pieces were omitted and the magnet elongated, in the direction of the magnetic flux, to locate the polar surfaces at the inner edge of the air gap. The angular movement of the pointer in instruments with a C-shaped magnet and a soft-iron core is limited to about 90°, but the angular movement of the pointer in instruments embodying the invention may be increased to about 115°. Furthermore, the flux density is substantially uniform throughout this range of movement of the coil and pointer, and the instrument scales may therefore be printed with uniformly divided graduations. This is of considerable practical value in the manufacture of instruments of relatively high precision as it eliminates the individual calibration of each instrument scale.

It is to be understood that the invention is not limited to the embodiments herein illustrated and described as various modifications which may occur to those familiar with the design and manufacture of electrical measuring instruments and relays fall within the spirit and scope of the invention as set forth in the following claims.

I claim:

1. An electrical instrument comprising the combination with a substantially cylindrical magnetized core assembly having mounting ribs of non-magnetic material projecting radially therefrom midway between the polar faces thereof, of a soft iron yoke having a bore within which said core assembly is located, a coil, means carried by the yoke supporting said coil for angular movement about said core assembly, means including said mounting ribs securing said core assembly to said yoke, and means for mounting said yoke upon a support; said core assembly comprising a permanent magnet of approximately rectangular cross-section magnetized in the direction of its shorter transverse dimension, the polar surfaces of the magnet being planar and symmetrically located with respect to the axis of the core assembly, and soft iron pole pieces of approximately segmental form in transverse cross-section secured to the planar polar surfaces of the magnet, the lateral edges of the pole pieces extending over and beyond the adjacent edges of the magnet.

2. An electrical instrument as recited in claim 1, wherein said ribs and pole pieces are secured to said magnet by solder.

3. An electrical instrument as recited in claim 1, wherein said core assembly comprises non-magnetic material molded upon said magnet and pole pieces to unite the same and to form said mounting ribs.

4. An electrical instrument as recited in claim 1, wherein said mounting ribs are provided with cylindrical bores, and said securing means comprises positioning pins threaded into said yoke and having cylindrical ends received snugly within said cylindrical bores of said mounting ribs of the core assembly.

5. An electrical instrument as recited in claim 4 wherein one of said positioning pins is of magnetic material and constitutes an adjustable magnetic shunt.

6. In a magnetic field structure for an electrical instrument, the combination with a core assembly comprising a permanent magnet of approximately rectangular cross-section and transversely magnetized, pole pieces of soft iron of substantially segmental cross-section having planar surfaces mating with the polar surfaces of the permanent magnet, a pair of non-magnetic mounting ribs rigidly secured to and projecting radially from said permanent magnet, said pole pieces having side flanges extending over the adjacent side edges of said permanent magnet and into contact with said ribs, means uniting said pole shoes and ribs to said magnet to form a unitary assembly, of a soft iron yoke having a substantially cylindrical bore therethrough, and means including said mounting ribs supporting said core assembly within the yoke.

7. In a magnetic field structure for electrical instruments, the invention as recited in claim 6, wherein said means uniting said pole shoes and ribs to said magnet comprises solder.

8. In a magnetic field structure for electrical instruments, the invention as recited in claim 6 wherein said means uniting said pole shoes and ribs to said magnet comprises non-magnetic material bonding said pole pieces to said magnet and forming said ribs.

9. In a magnetic field structure for electrical instruments, the invention as recited in claim 8, wherein said pole pieces are provided with circumferential grooves, and circumferential strips of said non-magnetic material are in said grooves to hold said pole pieces to the magnet.

10. In a magnetic field structure for electrical instruments, the invention as recited in claim 9, in combination with a retaining ring of non-magnetic material in said circumferential grooves and extending through said ribs of non-magnetic material.

11. In a magnetic field structure for electrical instruments, the invention as recited in claim 10, wherein there are a plurality of circumferential grooves in which retaining rings are located, and one of said mounting ribs is provided with a bore spaced longitudinally from said grooves for receiving a magnetic shunt and positioning pin.

12. A magnet assembly for a permanent magnet-moving coil instrument comprising a permanent magnet of approximately rectangular cross-section and magnetized in the direction of its shorter transverse direction, the polar faces of said magnet being planar and symmetrically located with respect to the major physical axis of the magnet, mounting ribs of non-magnetic material rigidly secured to and extending axially of the magnet midway between the polar faces thereof, and soft iron pole pieces of approximately segmental form secured to the planar polar faces of the magnet, the lateral edges of the pole pieces extending over and beyond the adjacent edges of the magnet to overlie and extend in surface engagement along the inner portions of said mounting ribs.

KARL M. LEDERER.

REFERENCES CITED

The following references are of record in the file of this patent:

UNITED STATES PATENTS

| Number | Name | Date |
| --- | --- | --- |
| Re. 22,623 | Hickok | Mar. 27, 1945 |
| 1,008,549 | Klinckert | Nov. 14, 1911 |
| 1,020,565 | Lowenberg | Mar. 19, 1912 |
| 1,022,795 | McClair | Apr. 9, 1912 |
| 1,550,240 | Browne | Aug. 18, 1925 |
| 1,920,764 | Nickle | Aug. 1, 1933 |
| 1,927,346 | Lawrence | Sept. 19, 1933 |
| 2,384,316 | Lamb | Sept. 4, 1945 |

FOREIGN PATENTS

| Number | Country | Date |
| --- | --- | --- |
| 298,763 | Great Britain | Oct. 18, 1928 |
| 422,878 | Great Britain | Apr. 23, 1934 |
| 514,349 | Great Britain | Jan. 21, 1938 |